United States Patent
Davis

(10) Patent No.: US 10,369,534 B2
(45) Date of Patent: Aug. 6, 2019

(54) CONVERTIBLE MIXER ASSEMBLY WITH A STAND

(71) Applicant: Tammie E. Davis, Hamilton, MS (US)

(72) Inventor: Tammie E. Davis, Hamilton, MS (US)

( * ) Notice: Subject to any disclaimer, the term of this patent is extended or adjusted under 35 U.S.C. 154(b) by 318 days.

(21) Appl. No.: 15/350,931

(22) Filed: Nov. 14, 2016

(65) Prior Publication Data

US 2018/0133669 A1    May 17, 2018

(51) Int. Cl.
*A47J 43/044* (2006.01)
*B01F 7/00* (2006.01)
*B01F 13/00* (2006.01)
*B01F 7/16* (2006.01)
*A47J 43/00* (2006.01)

(52) U.S. Cl.
CPC .......... *B01F 7/00725* (2013.01); *A47J 43/00* (2013.01); *B01F 7/0055* (2013.01); *B01F 7/00491* (2013.01); *B01F 7/00583* (2013.01); *B01F 7/00891* (2013.01); *B01F 7/1695* (2013.01); *B01F 13/002* (2013.01); *B01F 13/003* (2013.01); *A47J 2043/04445* (2013.01)

(58) Field of Classification Search
CPC .. B01F 7/00725; B01F 13/002; B01F 7/1695; B01F 7/00891; B01F 7/0055; B01F 7/00491; B01F 7/00583; B01F 13/003; A47J 43/00; A47J 2043/04436; A47J 2043/04445; A47J 2043/0449
USPC .......................................................... 366/129
See application file for complete search history.

(56) References Cited

U.S. PATENT DOCUMENTS

| | | | |
|---|---|---|---|
| 2,529,120 A | | 11/1950 | Wallach et al. |
| 2,823,017 A | * | 2/1958 | Schaus ................... A47J 43/044 310/91 |
| 2,943,846 A | * | 7/1960 | Lambert ............... A47J 43/044 366/199 |
| 3,224,743 A | * | 12/1965 | Freedman ............. A47J 43/044 112/258 |
| 3,482,893 A | * | 12/1969 | Butsch ..................... A47J 45/02 206/320 |
| 4,544,278 A | * | 10/1985 | Elkerbout ............. A47J 43/044 241/101.1 |
| 4,645,352 A | * | 2/1987 | Valbona ................ A47J 43/044 366/129 |
| D390,415 S | * | 2/1998 | Hippen ......................... D7/412 |
| 5,979,850 A | * | 11/1999 | Hippen ............... A47J 43/0705 248/309.2 |
| D462,569 S | * | 9/2002 | Chin ............................. D7/376 |
| 7,473,026 B2 | * | 1/2009 | Clawson ............. B01F 7/00583 134/33 |
| 7,578,611 B2 | * | 8/2009 | Hamilton .............. B01F 7/0005 366/129 |
| 8,746,957 B2 | * | 6/2014 | Garman ................ B01F 13/002 220/820 |

(Continued)

*Primary Examiner* — Charles Cooley

(57) ABSTRACT

A convertible mixer assembly converts a hand mixer for use as a stand mixer with additional attachments. The assembly includes a motor positioned within a mixer housing. Mixer ports extend into the mixer housing. A handle coupled to the mixer housing allows handheld use. Beater attachments are removably coupable to the mixer housing and rotated by the motor. A connector extends from the mixer housing. A slot extends into an outer surface of a stand. The slot receives the connector such that the stand is configured for holding the mixer housing for use without the mixer housing is handheld.

12 Claims, 9 Drawing Sheets

(56) References Cited

U.S. PATENT DOCUMENTS

| | | |
|---|---|---|
| 8,757,287 B2 | 6/2014 | Mak et al. |
| 2007/0159917 A1 | 7/2007 | Beesley et al. |
| 2010/0143558 A1* | 6/2010 | Aharonovitch .......... A23N 1/00 |
| | | 426/489 |
| 2011/0162986 A1* | 7/2011 | Garman ................ B01F 13/002 |
| | | 206/320 |
| 2011/0272506 A1 | 11/2011 | Boland et al. |
| 2018/0133669 A1* | 5/2018 | Davis .................. B01F 7/00583 |

* cited by examiner

CONVERTIBLE MIXER ASSEMBLY WITH A STAND

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to mixer devices and more particularly pertains to a new mixer device for converting a hand mixer for use as a stand mixer.

BRIEF SUMMARY OF THE INVENTION

An embodiment of the disclosure meets the needs presented above by generally comprising a motor positioned within a mixer housing. Mixer ports extend into the mixer housing. A handle coupled to the mixer housing allows handheld use. Beater attachments are removably coupable to the mixer housing and rotated by the motor. A connector extends from the mixer housing. A slot extends into an outer surface of a stand. The slot receives the connector such that the stand is configured for holding the mixer housing for use without the mixer housing is handheld.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
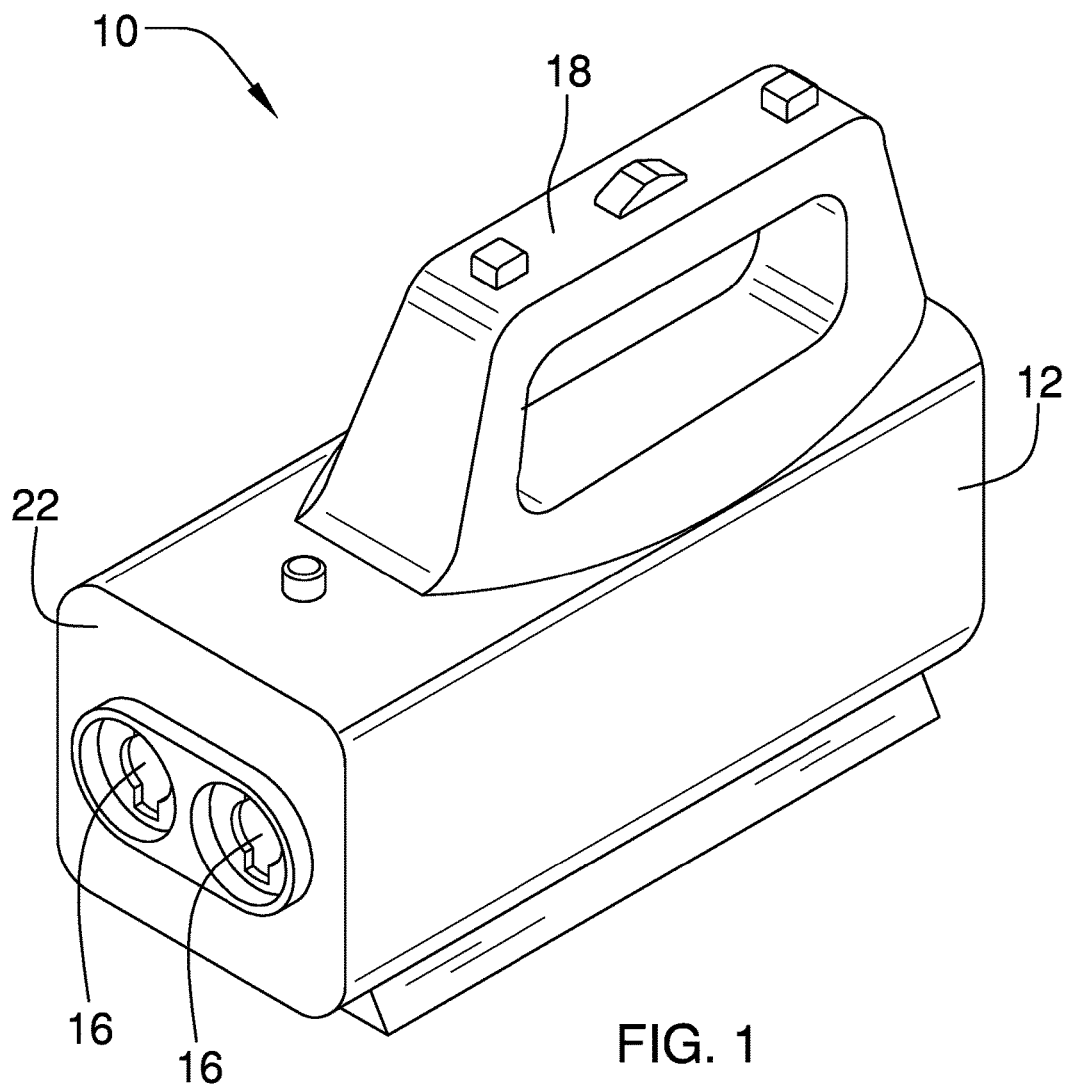
FIG. 1 is a top front side view of a convertible mixer assembly according to an embodiment of the disclosure.
Figure 2:
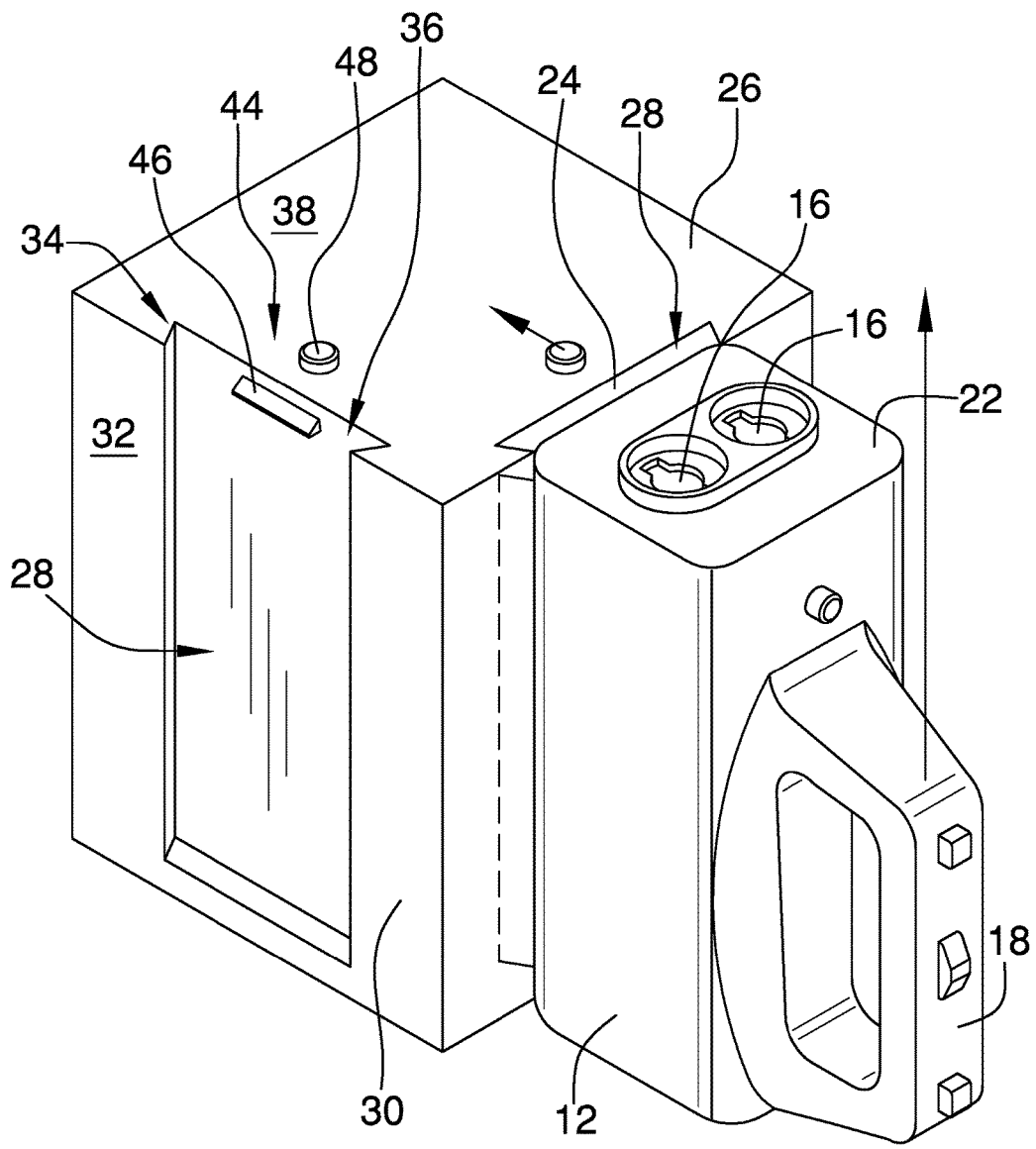
FIG. 2 is a top front side perspective view of an embodiment of the disclosure.
Figure 3:
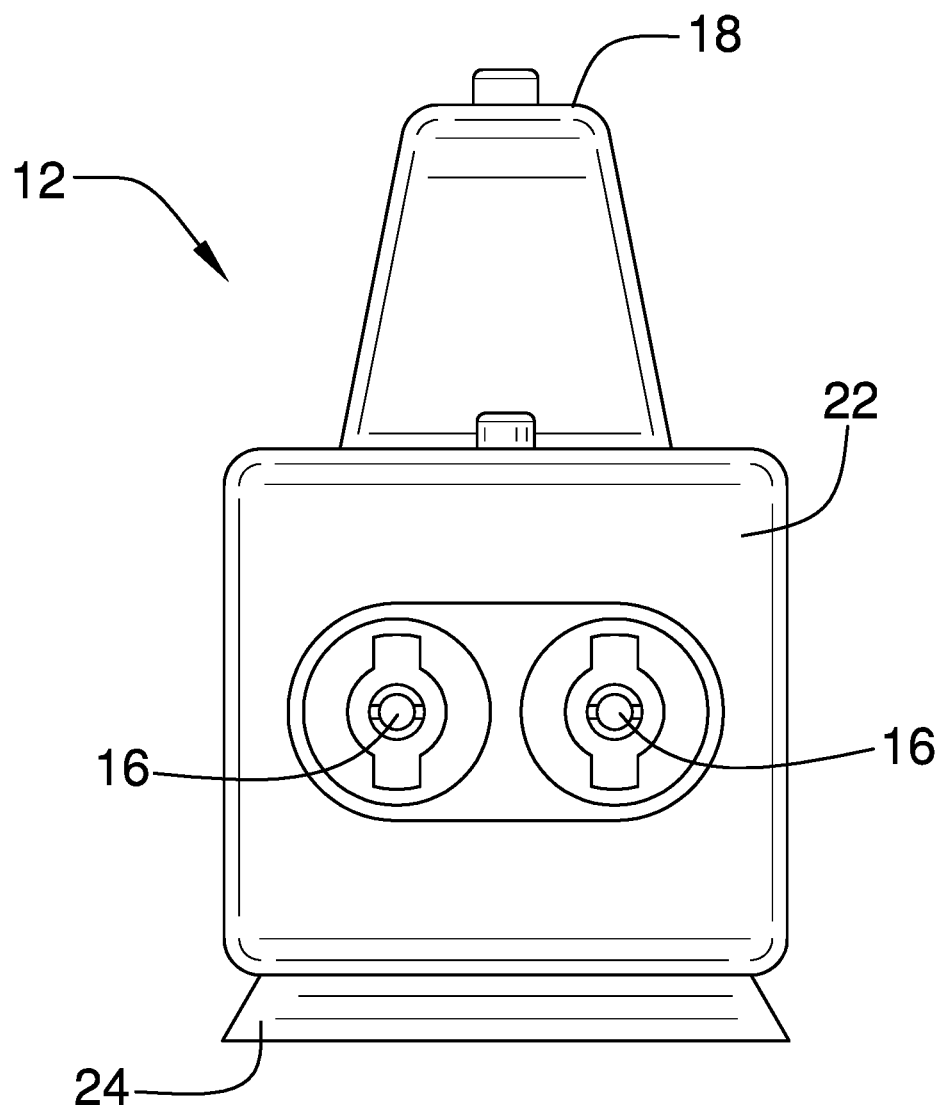
FIG. 3 is a front view of an embodiment of the disclosure.
Figure 4:
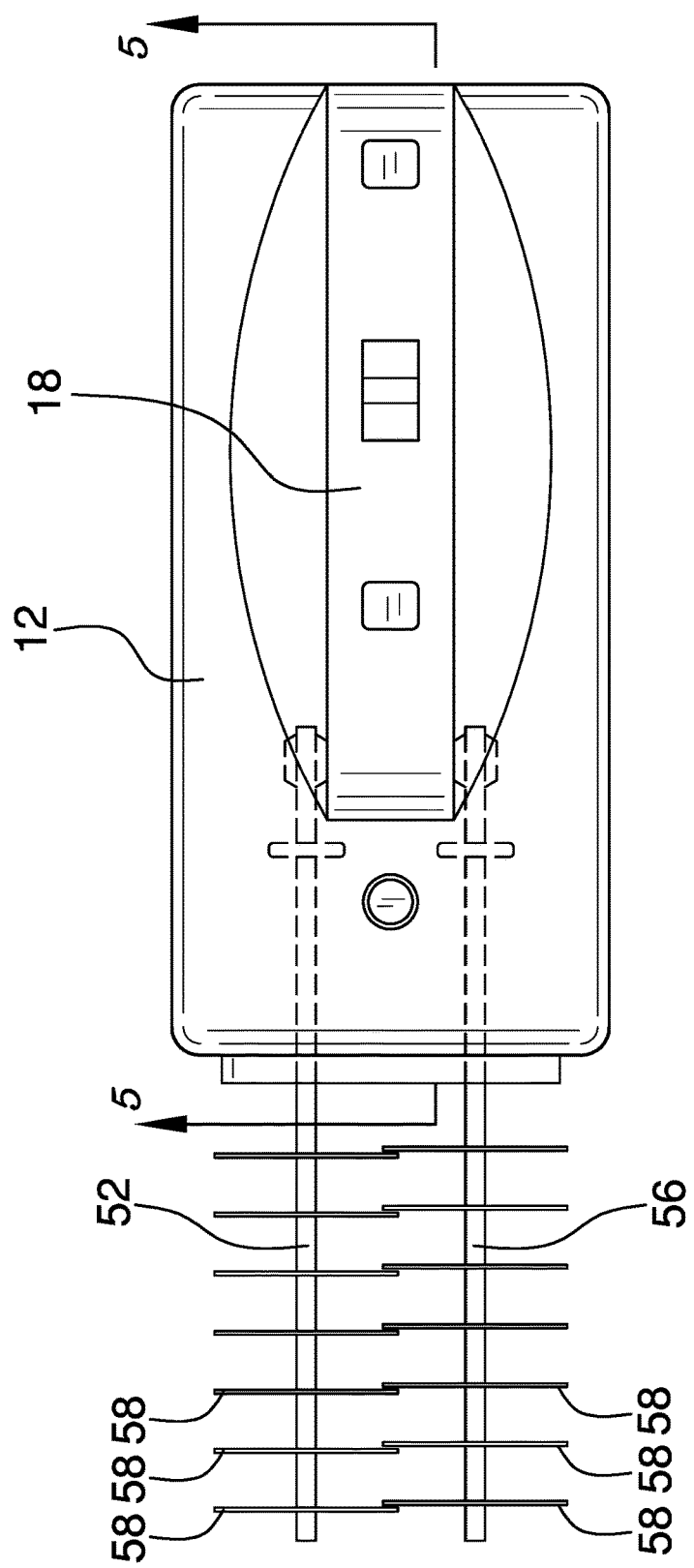
FIG. 4 is a top view of an embodiment of the disclosure.
Figure 5:
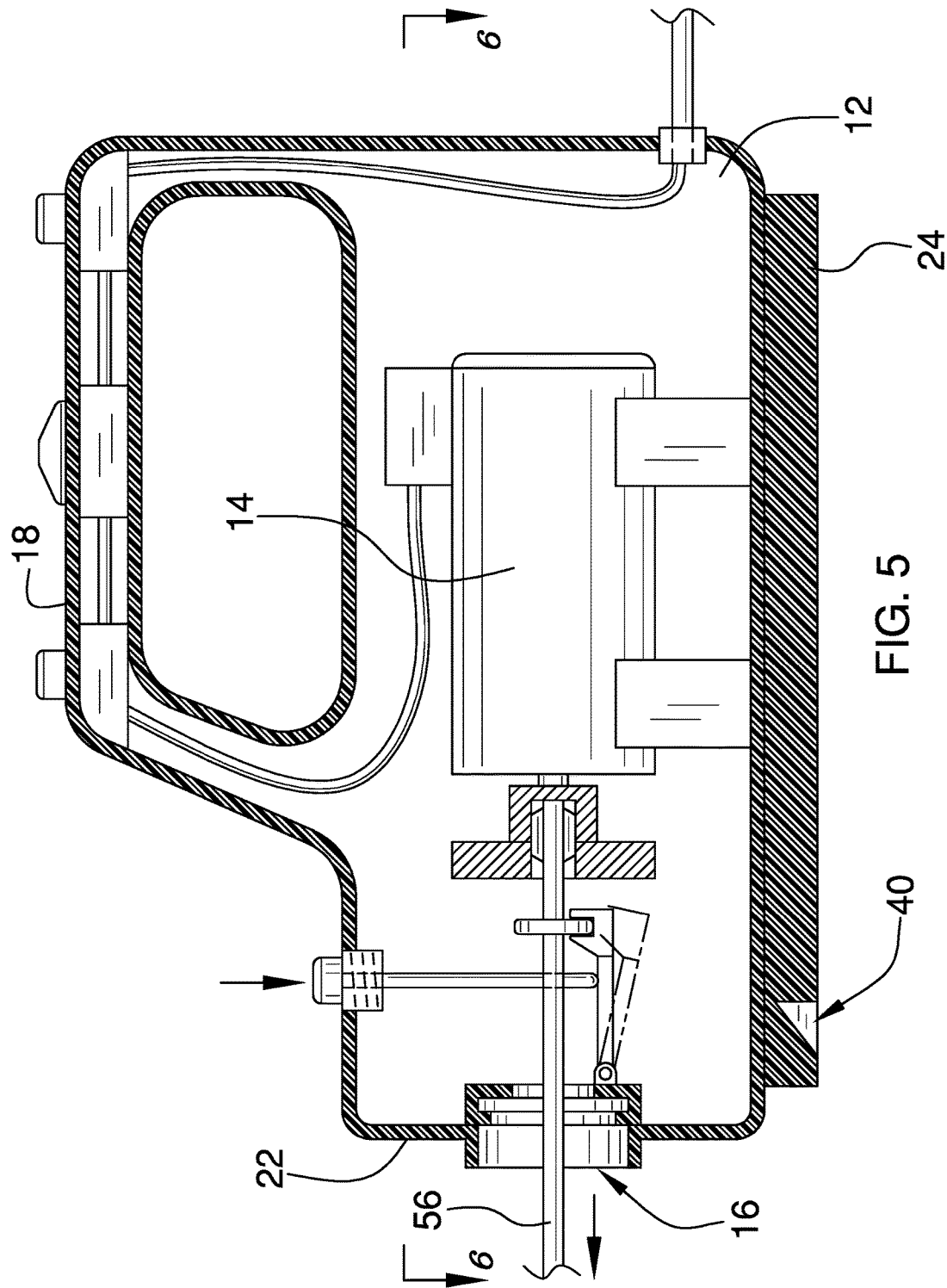
FIG. 5 is a cross-sectional view of an embodiment of the disclosure taken along line 5-5 of FIG. 4.
Figure 6:
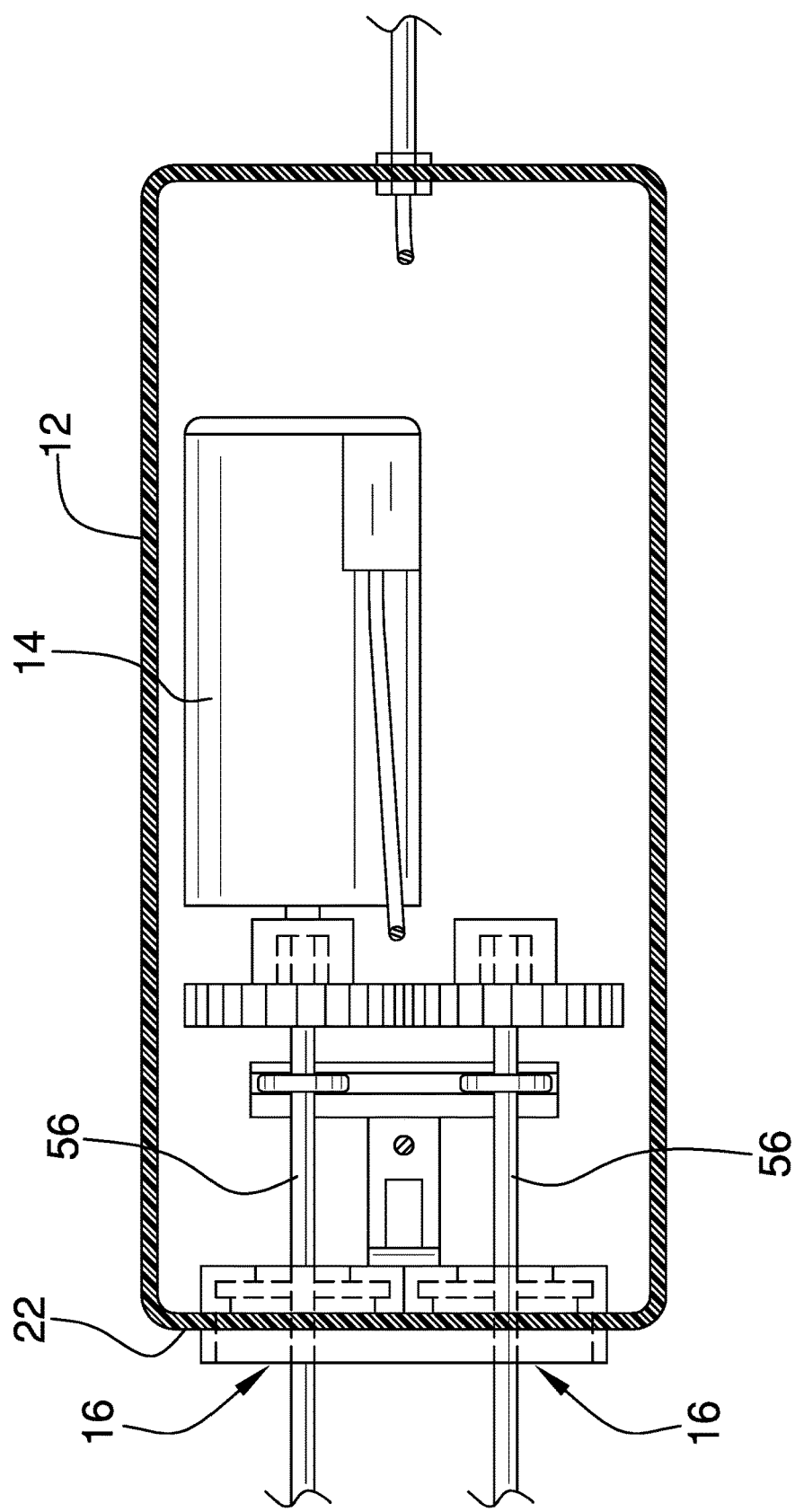
FIG. 6 is a cross-sectional view of an embodiment of the disclosure taken along line 6-6 of FIG. 5.
Figure 7:
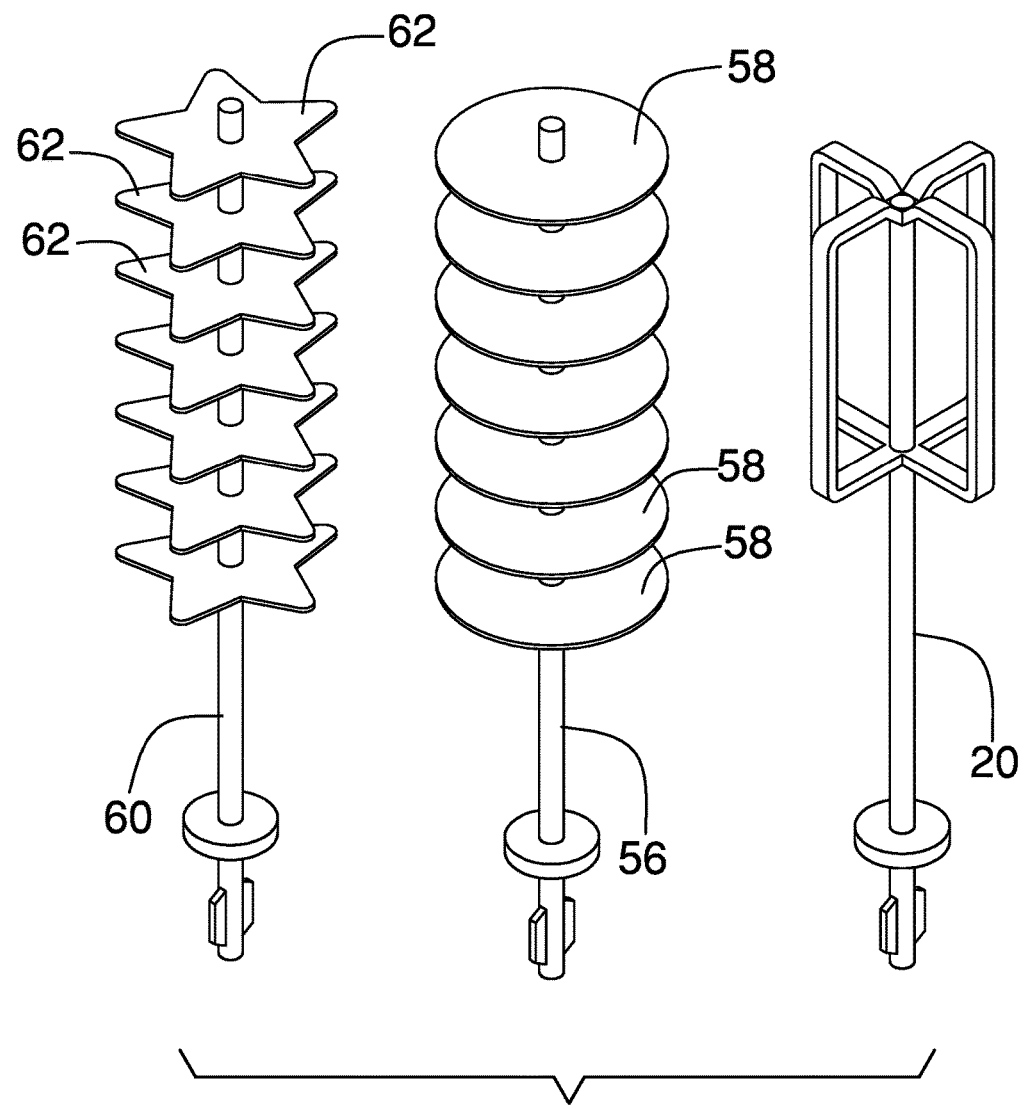
FIG. 7 is a top front perspective view of attachments of an embodiment of the disclosure.
Figure 8:
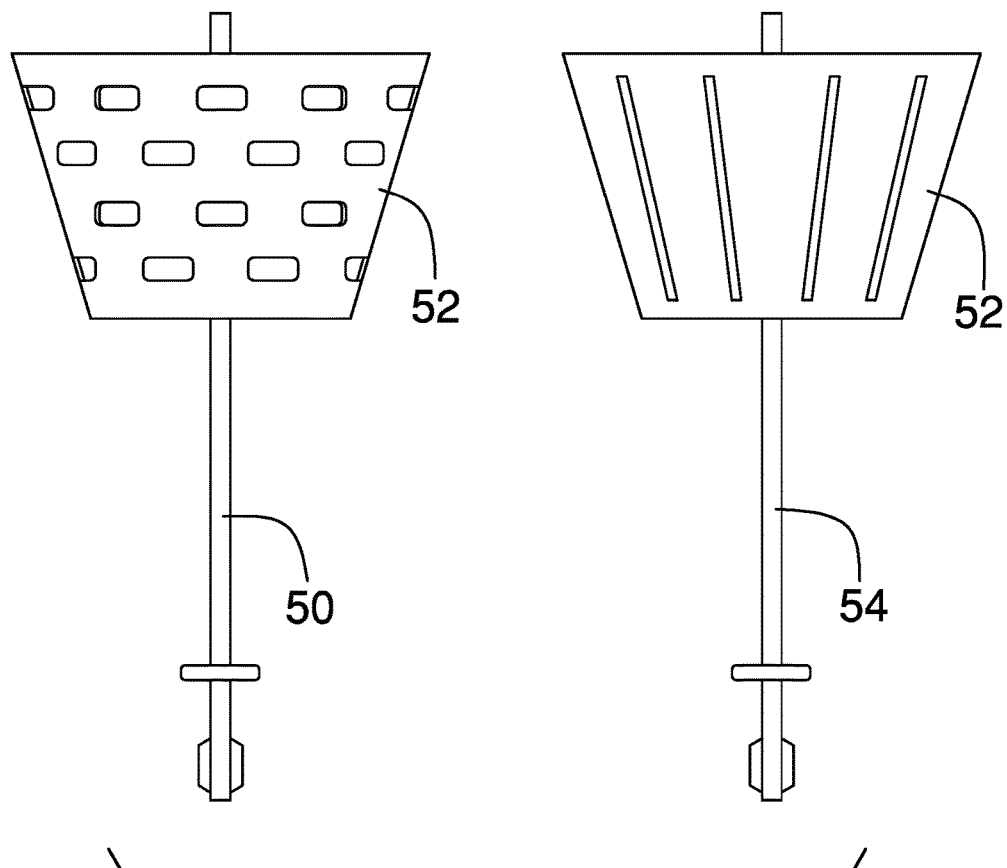
FIG. 8 is a front view of additional attachments of an embodiment of the disclosure.

With reference now to the drawings, and in particular to FIGS. 1 through 9 thereof, a new mixer device embodying the principles and concepts of an embodiment of the disclosure and generally designated by the reference numeral 10 will be described.

As best illustrated in FIGS. 1 through 9, the convertible mixer assembly 10 generally comprises a mixer housing 12 and a motor 14 positioned within the mixer housing 12. Each of a pair of mixer ports 16 extends into the mixer housing 12. A handle 18 is coupled to the mixer housing 12 wherein the mixer housing 12 is configured for being handheld during use. Each of a pair of beater attachments 20 is removably coupable to the mixer housing 12 by insertion of the beater attachments 20 into the mixer ports 16 wherein the beater attachments 20 are engaged to and extend from the mixer housing 12. The beater attachments 20 are rotated by the motor 14 when the beater attachments 20 are engaged to the mixer housing 12 and the motor 14 is engaged. The beater attachments 20 connect to the mixer housing 12 and may be released from the mixer housing 12 in a conventional manner similar to existing conventional handheld mixers. However, the mixer ports 16 extend into a front face 22 of the mixer housing 12 such that the beater attachments 20 are parallel to the handle 18 instead of perpendicular as in a conventional handheld mixer. Thus, the beater attachments 20 extend forwardly from the mixer housing 12 when the beater attachments 20 are engaged to the mixer housing 12. Despite the change in orientation of the beater attachments 20 relative to the handle 18, the beater attachments 20 function and may be used with the mixer housing 12 in a substantially conventional manner.

A connector 24 extends from the mixer housing 12. A stand 26 includes a slot 28 extending into an outer surface 30 of the stand 26. The slot 28 receives the connector 24 wherein the stand 26 is coupled to and supports the mixer housing 12 such that the stand 26 is configured holding the mixer housing 12 for use without the mixer housing 12 being handheld. The slot 28 is elongated extending into a side face 32 of the stand 26. A top end 34 of the slot 28 defines an opening 36 into the slot 28 from a top face 38 of the stand 26. The slot 28 has a trapezoidal cross-sectional shape perpendicular to a longitudinal axis of the slot 28 and the connector 24 has a complementary shape. A detent 40 extends into the connector 24. A locking mechanism 44 is coupled to the stand 26. The locking mechanism 44 engages the detent 40 such that the connector 24 is secured within the slot 28. The locking mechanism 44 includes a protrusion 46 extending into the slot 28 such that the protrusion 46 is positioned to engage the detent 40 when the connector 24 is fully inserted into the slot 28. The locking mechanism 44 includes a release 48. The release 48 is operationally coupled to the protrusion 46 wherein the protrusion 46 disengages from the detent 40 allowing the connector 24 to be removed from the slot 28 when the release 46 is actuated. The release 48 may incorporate a conventional sliding wedge physically obstructing retraction of the protrusion 46. Further, the protrusion 46 may be pivotally coupled to the mixer housing 12 and biased to extend into the slot 28 in a conventional manner.

Several attachments may be provided and utilized with the mixer housing 12 when the mixer housing 12 is engaged to the stand 26. A grater attachment 50 is removably couplable to a selectable one of the mixer ports 16. The motor 14 rotates the grater attachment 50 when the motor 14 is engaged allowing a person to hold an item against a drum 52 of the grater attachment 50 to grate the item. Although not shown, the grater attachment 50 may include a shroud and feeder mechanism similar to grater attachments conventionally known for attachment to a conventional stand mixer. The attachments may include a slicer attachment 54 removably couplable to a selectable one of the mixer ports 16 to rotate the slicer attachment 54 when the motor 14 is engaged. The slicer attachment 54 may have a similar drum structure to the grater attachment 50 but utilizing slots with sharpened edges for slicing instead of grating.

The attachments may also include a pair of cutter attachments 56 removably coupable to the mixer housing 12 by insertion of the cutter attachments 56 into the mixer ports 16 wherein the cutter attachments 56 are engaged to and extend from the mixer housing 12. Each of the cutter attachments 56 has a respective plurality of cutting discs 58 spaced along the cutting attachment 56. Each cutting disc 58 overlaps between the cutter attachments 56 with a corresponding adjacently positioned one of the cutting discs 58. The continuous overlap and adjacent positioning produces a shearing action as the cutter attachments 56 are rotated by the motor 14 when the cutter attachments 56 are engaged to the mixer housing 12 and the motor 14 is engaged. Thus, a sheet of pasta or the like may be passed between the cutter attachments to produce strips. Similarly, each of a pair of perforation attachments 60 is removably coupable to the mixer housing 12 by insertion of the perforation attachments 60 into the mixer ports 16 wherein the perforation attachments 60 are engaged to and extend from the mixer housing 12. Each of the perforation attachments 60 has a respective plurality of perforation discs 62 spaced along the perforation attachment 60. Each perforation disc 62 overlaps between the perforation attachments 60 with a corresponding adjacently positioned one of the perforation discs 62. The perforation attachments 60 are rotated by the motor 14 when the perforation attachments 60 are engaged to the mixer housing 12 and the motor 14 is engaged wherein the perforation attachments 60 are configured for perforating a sheet of material, such as pasta, dough, or the like, passed between the perforation attachments 60. The perforation discs 62 generally have a arms 64 extending out to produce alternating shearing and gaps between the perforation attachments 60.

Figure 9:
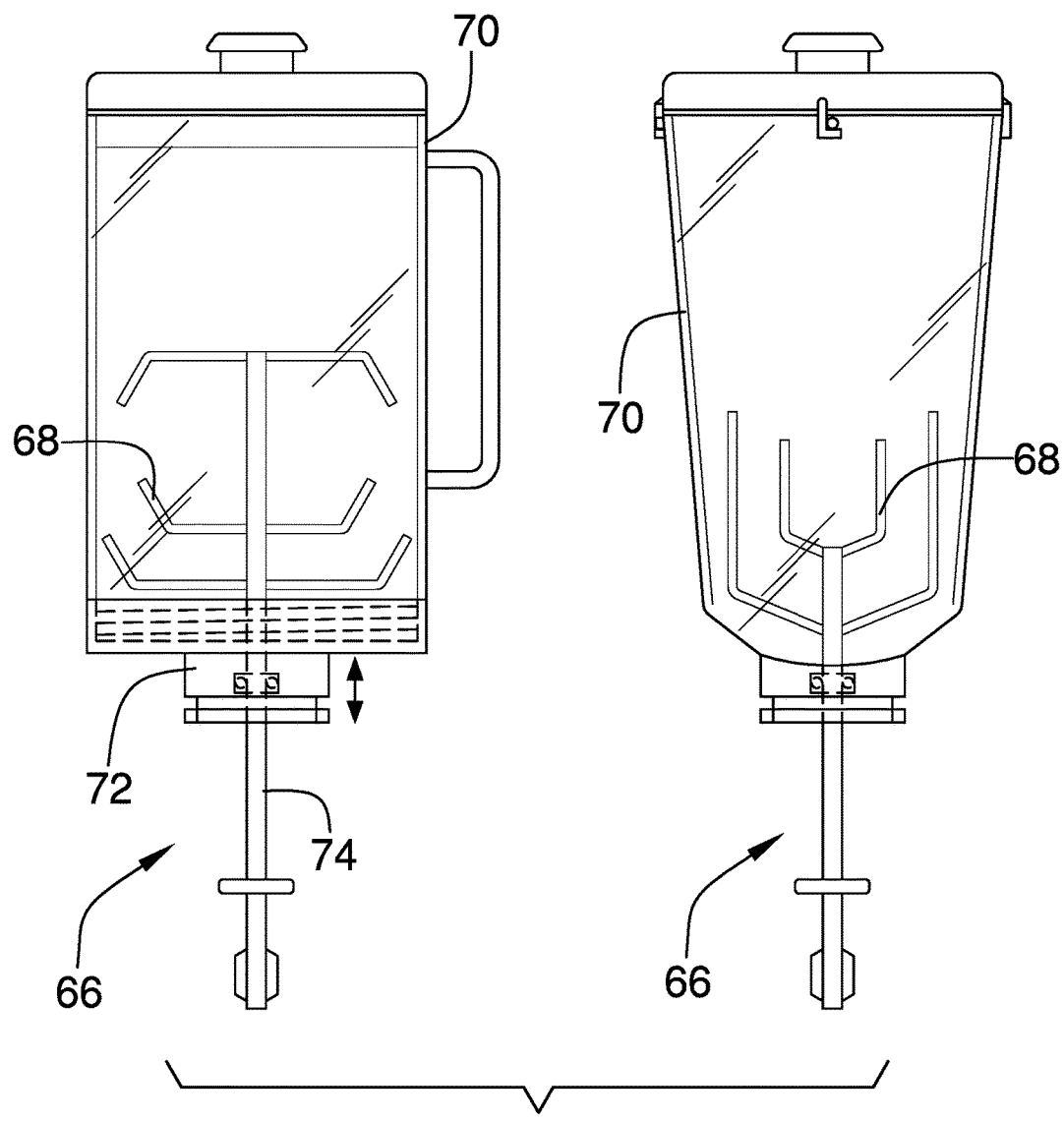
FIG. 9 is a front view of other attachments for an embodiment of the disclosure.

The attachments may also include a blender attachment 66 removably couplable to a selectable one of the mixer ports 16 wherein the motor 14 rotates a blade 68 within a container 70 of the blender attachment 66 when the motor 14 is engaged. The blender attachment 66 may have alternative blade configurations and container shapes as shown in FIG. 9. A base 72 of the container 70 may be separable from a shaft section 74 of the blender attachment 66.

In use, the mixer housing 12 converts from use being handheld to use hands free when the mixer housing 12 is attached to the stand 26. The stand 26 may also incorporate multiple slots 28 similarly structured for use with multiple mixer housings 12 to provide stations for various tasks and to facilitate transitions between tasks without having to disengage and clean the desired attachments as frequently.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A convertible mixer assembly comprising:
a mixer housing;
a motor positioned within said mixer housing;
a pair of mixer ports extending into said mixer housing;
a handle coupled to said mixer housing wherein said mixer housing is configured for being handheld during use;
a pair of beater attachments removably coupable to said mixer housing by insertion of said beater attachments into said mixer ports wherein said beater attachments are engaged to and extend from said mixer housing, said beater attachments being rotated by said motor when said beater attachments are engaged to said mixer housing and said motor is engaged;
a connector extending from said mixer housing;
a stand, said stand including a slot extending into an outer surface of said stand, said slot receiving said connector wherein said stand is coupled to and supports said mixer housing such that said stand is configured holding said mixer housing for use without said mixer housing being handheld;
a detent extending into said connector; and
a locking mechanism coupled to said stand, said locking mechanism engaging said detent such that said connector is secured within said slot, said locking mechansim including a protrusion extending into said slot such that said protrusion is positioned to engage said detent when said connector is fully inserted into said slot, said locking mechanism including a release, said release being operationally coupled to said protrusion wherein said protrusion disengages from said detent allowing said connector to be removed from said slot when said release is actuated.

2. A convertible mixer assembly comprising:
a mixer housing;
a motor positioned within said mixer housing;
a pair of mixer ports extending into said mixer housing;
a handle coupled to said mixer housing wherein said mixer housing is configured for being handheld during use;
a pair of beater attachments removably coupable to said mixer housing by insertion of said beater attachments into said mixer ports wherein said beater attachments are engaged to and extend from said mixer housing, said beater attachments being rotated by said motor when said beater attachments are engaged to said mixer housing and said motor is engaged, said mixer ports extending into a front face of said mixer housing parallel to said handle wherein said beater attachments extend forwardly from said mixer housing when said beater attachments are engaged to said mixer housing;
a connector extending from said mixer housing;
a stand, said stand including a slot extending into an outer surface of said stand, said slot receiving said connector wherein said stand is coupled to and supports said mixer housing such that said stand is configured holding said mixer housing for use without said mixer housing being handheld, said slot being elongated extending into a side face of said stand, a top end of said slot defining an opening into said slot from a top face of said stand, said slot having a trapezoidal cross-sectional shape perpendicular to a longitudinal axis of said slot;
a detent extending into said connector;
a locking mechanism coupled to said stand, said locking mechanism engaging said detent such that said connector is secured within said slot, said locking mechansim including a protrusion extending into said slot such that said protrusion is positioned to engage said detent when said connector is fully inserted into said slot, said locking mechanism including a release, said release being operationally coupled to said protrusion wherein said protrusion disengages from said detent allowing said connector to be removed from said slot when said release is actuated;
a grater attachment removably couplable to a selectable one of said mixer ports wherein said motor rotates said grater attachment when said motor is engaged;
a slicer attachment removably couplable to a selectable one of said mixer ports wherein said motor rotates said slicer attachment when said motor is engaged;
a pair of cutter attachments removably couplable to said mixer housing by insertion of said cutter attachments into said mixer ports wherein said cutter attachments are engaged to and extend from said mixer housing, each of said cutter attachments having a respective plurality of cutting discs spaced along said cutting attachment, each said cutting disc overlapping between said cutter attachments with a corresponding adjacently positioned one of said cutting discs, said cutter attach-ments being rotated by said motor when said cutter attachments are engaged to said mixer housing and said motor is engaged;
a pair of perforation attachments removably coupable to said mixer housing by insertion of said perforation attachments into said mixer ports wherein said perforation attachments are engaged to and extend from said mixer housing, each of said perforation attachments having a respective plurality of perofration discs spaced along said perforation attachment, each said perforation disc overlapping between said perforation attachments with a corresponding adjacently positioned one of said perforation discs, said perforation attachments being rotated by said motor when said perforation attach-ments are engaged to said mixer housing and said motor is engaged wherein said perforation attachments are configured for perforating a sheet of material passed between said perforation attachments; and
a blender attachment removably couplable to a selectable one of said mixer ports wherein said motor rotates a blade within a container of said blender attachment when said motor is engaged.

3. A convertible mixer assembly comprising:
a mixer housing;
a motor positioned within said mixer housing;
a pair of mixer ports extending into said mixer housing;
a handle coupled to said mixer housing wherein said mixer housing is configured for being handheld during use;
a pair of beater attachments removably coupable to said mixer housing by insertion of said beater attachments into said mixer ports wherein said beater attachments are engaged to and extend from said mixer housing, said beater attachments being rotated by said motor when said beater attachments are engaged to said mixer housing and said motor is engaged;
a connector extending from said mixer housing; and
a stand, said stand including a slot extending into an outer surface of said stand, said slot receiving said connector wherein said stand is coupled to and supports said mixer housing such that said stand is configured hold-ing said mixer housing for use without said mixer housing being handheld, said slot having a trapezoidal cross-sectional shape perpendicular to a longitudinal axis of said slot.

4. The assembly of claim 3, further comprising said slot being elongated extending into a side face of said stand, a top end of said slot defining an opening into said slot from a top face of said stand.

5. The assembly of claim 3, further comprising said mixer ports extending into a front face of said mixer housing parallel to said handle wherein said beater attachments extend forwardly from said mixer housing when said beater attachments are engaged to said mixer housing.

6. The assembly of claim 3, further comprising:
a detent extending into said connector; and
a locking mechanism coupled to said stand, said locking mechanism engaging said detent such that said con-nector is secured within said slot.

7. The assembly of claim 6, further comprising said locking mechansim including a protrusion extending into said slot such that said protrusion is positioned to engage said detent when said connector is fully inserted into said slot.

8. The assembly of claim 3, further comprising a grater attachment removably couplable to a selectable one of said mixer ports wherein said motor rotates said grater attachment when said motor is engaged.

9. The assembly of claim 3, further comprising a slicer attachment removably couplable to a selectable one of said mixer ports wherein said motor rotates said slicer attachment when said motor is engaged.

10. The assembly of claim 3, further comprising a pair of cutter attachments removably coupable to said mixer housing by insertion of said cutter attachments into said mixer ports wherein said cutter attachments are engaged to and extend from said mixer housing, each of said cutter attachments having a respective plurality of cutting discs spaced along said cutting attachment, each said cutting disc overlapping between said cutter attachments with a corresponding adjacently positioned one of said cutting discs, said cutter attachments being rotated by said motor when said cutter attachments are engaged to said mixer housing and said motor is engaged.

11. The assembly of claim 3, further comprising a pair of perforation attachments removably coupable to said mixer housing by insertion of said perforation attachments into said mixer ports wherein said perforation attachments are engaged to and extend from said mixer housing, each of said perforation attachments having a respective plurality of perofration discs spaced along said perforation attachment, each said perforation disc overlapping between said perforation attachments with a corresponding adjacently positioned one of said perforation discs, said perforation attachments being rotated by said motor when said perforation attachments are engaged to said mixer housing and said motor is engaged wherein said perforation attachments are configured for perforating a sheet of material passed between said perforation attachments.

12. The assembly of claim 3, further comprising a blender attachment removably couplable to a selectable one of said mixer ports wherein said motor rotates a blade within a container of said blender attachment when said motor is engaged.

* * * * *